(12) United States Patent
Kuo

(10) Patent No.: US 7,995,337 B2
(45) Date of Patent: Aug. 9, 2011

(54) SHOCK-ABSORBING STRUCTURE FOR STORAGE APPARATUS

(75) Inventor: Yan-Lin Kuo, Taipei Hsien (TW)

(73) Assignee: Acer Inc., Taipei Hsien (TW)

( * ) Notice: Subject to any disclaimer, the term of this patent is extended or adjusted under 35 U.S.C. 154(b) by 482 days.

(21) Appl. No.: 12/000,804

(22) Filed: Dec. 18, 2007

(65) Prior Publication Data

US 2008/0197264 A1 Aug. 21, 2008

(30) Foreign Application Priority Data

Feb. 16, 2007 (TW) .............................. 96106569 A

(51) Int. Cl.
*G06F 1/16* (2006.01)

(52) U.S. Cl. ........... 361/679.34; 361/679.33; 312/223.1; 312/223.2

(58) Field of Classification Search ............. 361/679.33, 361/679.34
See application file for complete search history.

(56) References Cited

U.S. PATENT DOCUMENTS

| | | | | |
|---|---|---|---|---|
| 6,094,342 A * | 7/2000 | Dague et al. | ............. | 361/679.33 |
| 6,130,817 A * | 10/2000 | Flotho et al. | ............. | 361/679.31 |
| 6,227,516 B1 * | 5/2001 | Webster et al. | ............... | 248/694 |
| 6,304,440 B1 * | 10/2001 | Lin | .......................... | 361/679.34 |
| 6,304,457 B1 * | 10/2001 | Liu et al. | ........................ | 361/799 |
| 6,394,509 B1 * | 5/2002 | Kurek, III | ..................... | 292/199 |
| 6,396,686 B1 * | 5/2002 | Liu et al. | .................... | 361/679.33 |
| 6,487,081 B2 * | 11/2002 | Homer et al. | ................. | 361/730 |
| 6,798,651 B2 * | 9/2004 | Syring et al. | ............. | 361/679.34 |
| 6,948,967 B2 * | 9/2005 | Scherer et al. | ................ | 439/377 |
| 7,092,250 B2 * | 8/2006 | Chen et al. | ............... | 361/679.35 |
| 7,148,418 B2 * | 12/2006 | Ku et al. | ........................ | 361/752 |
| 7,251,099 B2 * | 7/2007 | Kao et al. | .................. | 361/679.33 |
| 7,369,402 B2 * | 5/2008 | Huang | ..................... | 361/679.33 |
| 7,486,509 B2 * | 2/2009 | Kim et al. | ................ | 361/679.34 |
| 7,515,407 B2 * | 4/2009 | Goodman et al. | ........ | 361/679.34 |
| 7,616,436 B2 * | 11/2009 | DeMoss et al. | ........... | 361/679.34 |
| 2002/0101713 A1 * | 8/2002 | Eland | ............................ | 361/686 |
| 2003/0011980 A1 * | 1/2003 | Albrecht et al. | ............. | 361/685 |
| 2006/0023413 A1 * | 2/2006 | Lo et al. | ........................ | 361/684 |
| 2006/0023416 A1 * | 2/2006 | Chen | .............................. | 361/685 |
| 2007/0030639 A1 * | 2/2007 | Ko | ................................ | 361/685 |
| 2007/0230105 A1 * | 10/2007 | Su | ................................ | 361/685 |

* cited by examiner

*Primary Examiner* — Jayprakash N Gandhi
*Assistant Examiner* — Anthony Q Edwards
(74) *Attorney, Agent, or Firm* — Rosenberg, Klein & Lee

(57) ABSTRACT

The present invention relates to a shock-absorbing structure for a storage apparatus, which includes a first arm and a second arm. The first and the second arms are secured on both sides of a storage apparatus. One or more first penetrating troughs and one or more second penetrating troughs are adapted on the first and the second arms, respectively. A plurality of first buffer members is adapted on the first and the second penetrating troughs. By securing the storage apparatus using the present invention, shocks imposed on the storage apparatus can be eased, and thereby the lifetime can be increased.

8 Claims, 9 Drawing Sheets

SHOCK-ABSORBING STRUCTURE FOR STORAGE APPARATUS

FIELD OF THE INVENTION

The present invention relates to a shock-absorbing structure, and particularly to a shock-absorbing structure for a storage apparatus.

BACKGROUND OF THE INVENTION

With the trend of the era, the design of technological products changes accordingly. For example, for better portability, modern electronic products are designed small. Owing to this trend, desktop computers have evolved into modern notebook computers, which provide a best evidence for the shrinkage trend in electronic products for better portability.

Take notebook computer for example. Modern notebook computers have a storage apparatus such as a hard disk. However, a hard disk comprises a read/write head and reads or writes data by closing to a disk by a small distance. If the storage apparatus is vibrated by external forces, the read/write head will surely touch the disk directly and bring damages to the disk or to the read/write head. Shock-absorbing protection is provided to current hard disks by installing a buffer member at the bottom of the storage apparatus for reducing the impact energy imposed by external forces. Thereby, damages on the read/write heads or disks can be avoided. However, because the buffer member is installed at the bottom of the storage apparatus, only vertical but not horizontal impact energy can be absorbed. Hence, the shock-absorbing effect is limited. In addition, according to the prior art, a larger holding space is provided to accommodate the storage apparatus. When the storage apparatus is impacted by external forces, the storage apparatus will move arbitrarily in the holding space, resulting in secondary impact on the storage apparatus and increasing possibility of damage on the storage apparatus.

Besides, because the buffer member is installed at the bottom of the storage apparatus, the storage apparatus cannot dissipate heat effectively. Hence, the lifetime of the storage apparatus will be affected. Thereby, the techniques according to the prior art can neither protect the storage apparatus effectively nor lengthen the lifetime thereof.

Accordingly, the present invention provides a shock-absorbing structure for a storage apparatus, which not only can reduce the vertical vibration energy on the storage apparatus, but also can absorb horizontal vibration energy on the storage apparatus. In addition, it can increase the heat-dissipation efficiency of the storage apparatus. Hence, the problems described above can be solved.

SUMMARY

An objective of the present invention is to provide a shock-absorbing structure for a storage apparatus, which can absorb vibration energy imposed on the storage apparatus by adapting a plurality of penetrating troughs on a first arm and a second arm used for securing the storage apparatus with buffer members therein. Thereby, the vibration energy received by the storage apparatus can be absorbed, and the lifetime thereof can be increased.

Another objective of the present invention is to provide a shock-absorbing structure for a storage apparatus. By using reinforcement parts adapted in the penetrating troughs of the arms, which are used for securing the storage apparatus, the strength of the penetrating troughs can be reinforced, and the lifetime of the present invention can be increased.

A further objective of the present invention is to provide a shock-absorbing structure for a storage apparatus. By adapting pillars inside of the arms, which are used for securing the storage apparatus, and by inserting said pillars into the securing holes outside of the storage apparatus, the storage apparatus can be secured.

Still another objective of the present invention is to provide a shock-absorbing structure for a storage apparatus. By adapting a plurality of salient parts on the upper and lower edges as well as on the outer side of the arms, which are used for securing the storage apparatus, the friction produced when the storage apparatus is installed in a holding space will be reduced owing to the salient parts. Thereby, the smoothness when installing the storage apparatus is enhanced. Besides, the salient parts can produce a gap between the storage apparatus and the holding space. Hence, the heat-dissipating efficiency of the storage apparatus can be increased, and the lifetime of the storage apparatus can be increased as well.

The shock-absorbing structure for a storage apparatus according to the present invention includes a first arm and a second arm positioned on both sides of the storage apparatus for securing the storage apparatus. The first and the second arms have one or more first penetrating troughs and one or more penetrating troughs, respectively, and a plurality of first buffer members adapted in the first and the second penetrating troughs, respectively. By coordination of the penetrating troughs and the buffer members, shock energy imposed on the storage apparatus can be absorbed. Thereby, the lifetime of the storage apparatus can be increased.

Besides, according to the present invention, reinforcement parts are adapted on the sidewalls of the penetrating troughs. Thereby, the strength of the penetrating troughs can be reinforced, and the lifetime of the present invention can be increased. Moreover, a plurality of salient parts is adapted on the upper and lower edges as well as on the outer side of the first and the second arms. By using said salient parts, the contact areas for installation can be reduced. Thereby, the friction is reduced and hence the smoothness when installing the storage apparatus is enhanced. Besides, the salient parts can produce a gap between the storage apparatus and the holding space. Thus, the heat-dissipating efficiency of the storage apparatus can be increased, and the lifetime of the storage apparatus can be increased as well.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 1A:
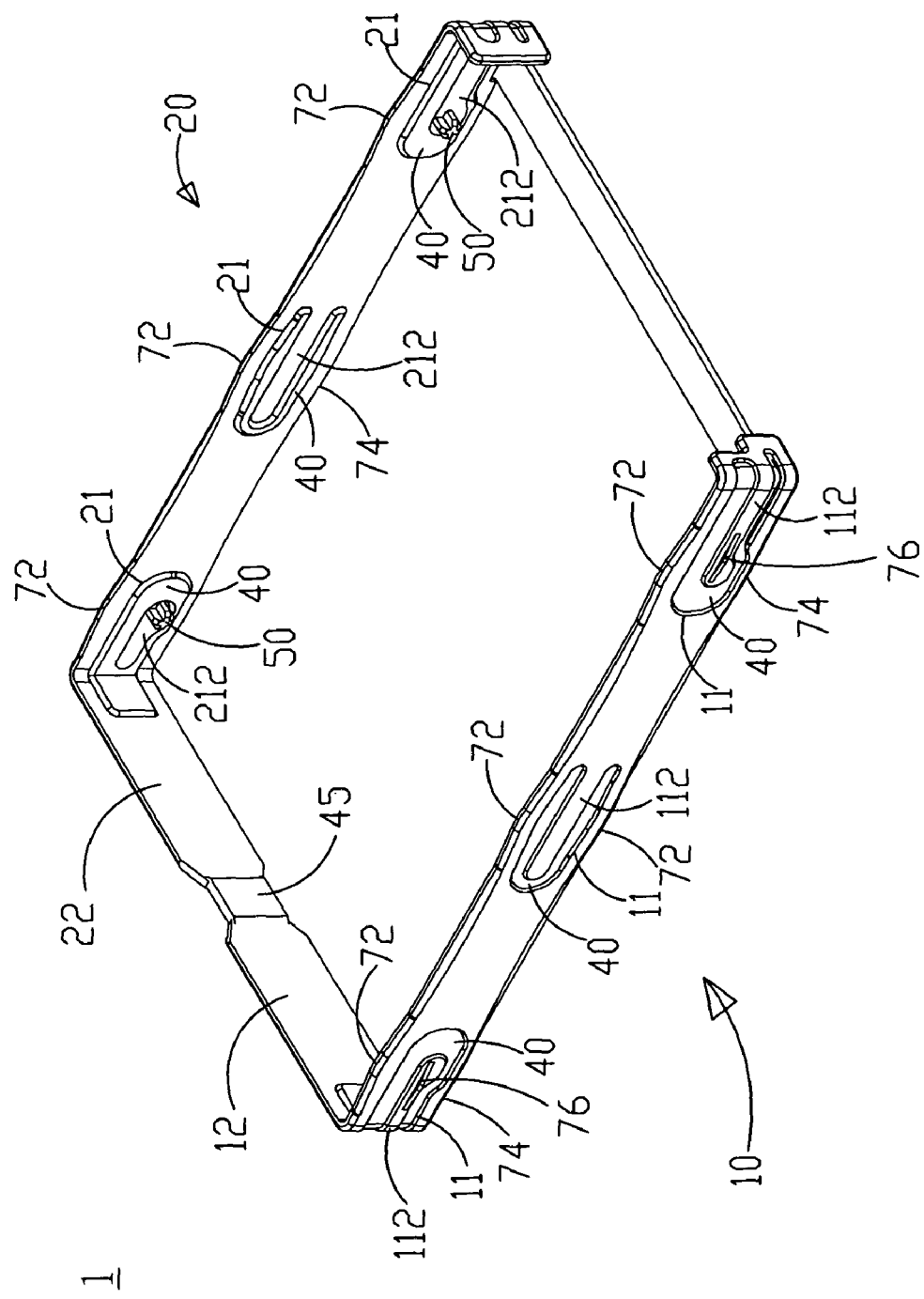
FIG. 1A shows a three-dimensional view of a shock-absorbing structure according to a preferred embodiment of the present invention.
Figure 1B:
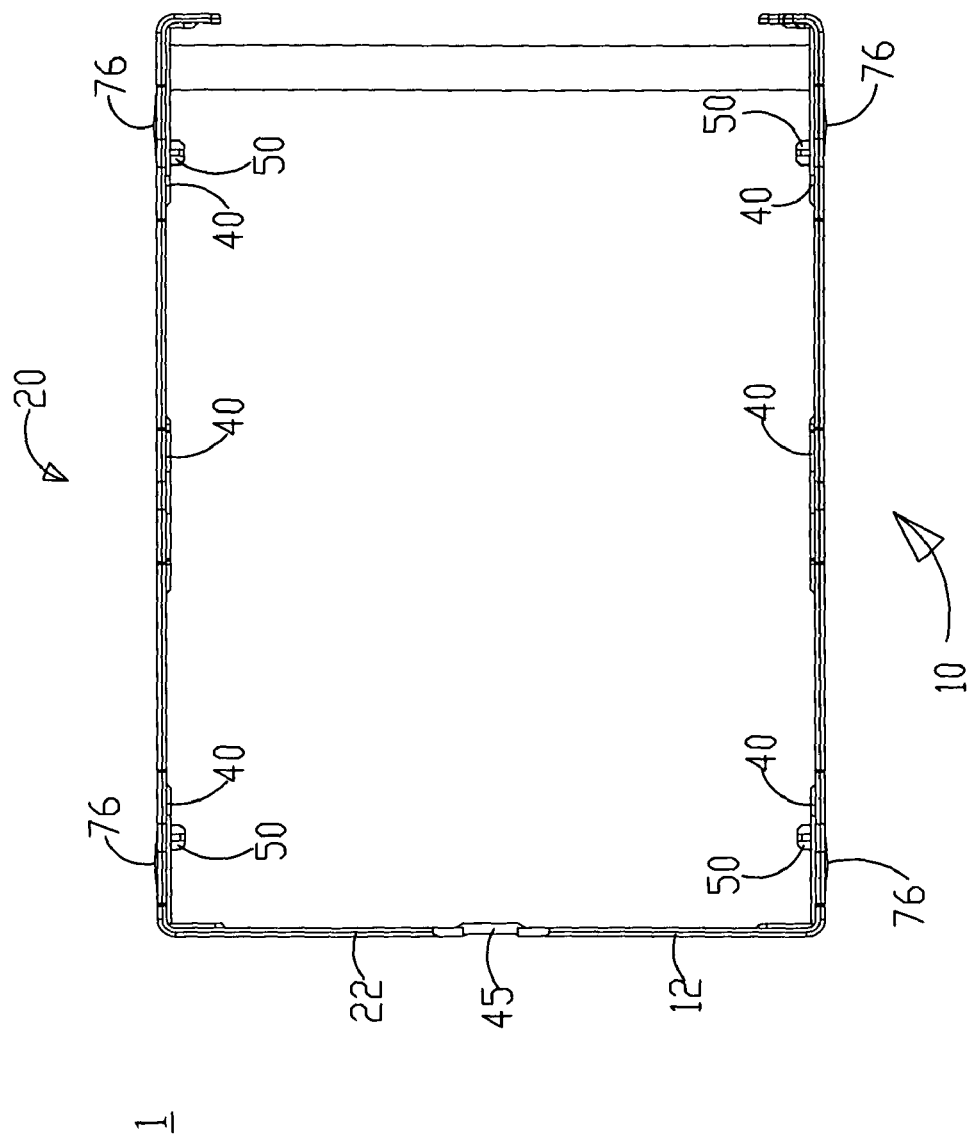
FIG. 1B shows a top view of a shock-absorbing structure according to a preferred embodiment of the present invention.
Figure 2:
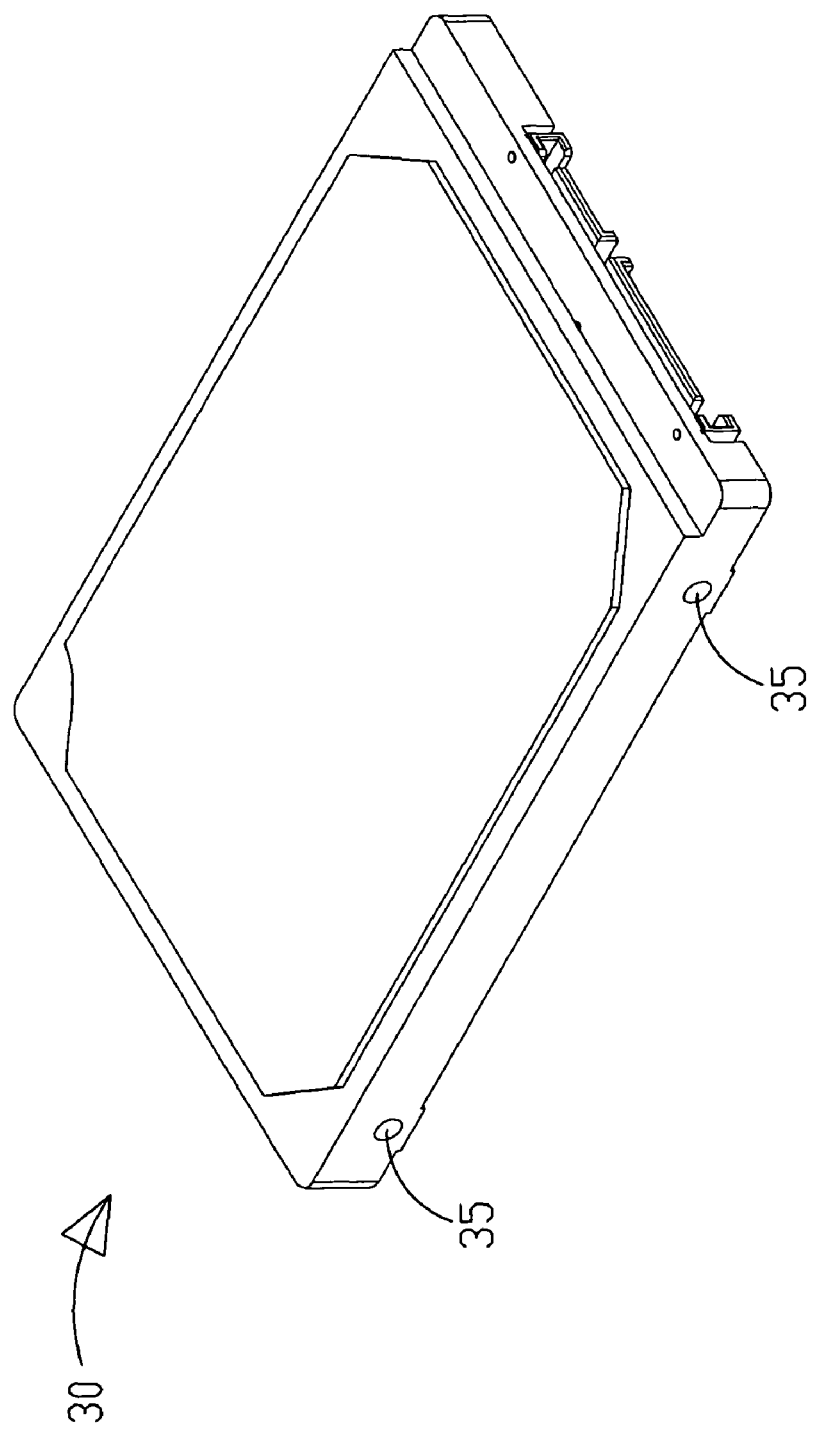
FIG. 2 shows a three-dimensional view of a storage apparatus according to a preferred embodiment of the present invention.

FIGS. 1A, 1B, and 2 show a three-dimensional view and a top view of a shock-absorbing structure, and a three-dimensional view of a storage apparatus according to a preferred embodiment of the present invention. As shown in the figures, the shock-absorbing structure for a storage apparatus according to the present invention includes a frame 1 used for securing a storage apparatus 30. The frame 1 includes a first arm 10 and a second arm 20, which are located on both sides of the storage apparatus 30, and are used for securing a storage apparatus 30. The first and the second arms 10, 20 have one or more first penetrating troughs 11 and one or more second penetrating troughs 21, respectively. A first transition part 12 and a second transition part 22 are adapted on one end extending from the first arm 10 and the second arm 20, respectively. The first and the second transition parts 12, 22 communicate with each other. A plurality of first buffer members 40 is adapted in the first and the second penetrating troughs 11, 21. The material of the first and the second arms 10, 20 described above can be plastic, while the material of the first buffer members 40 can be rubber.

Because the first and the second arms 10, 20 according to the present invention have the first buffer members 40, which contact with the storage apparatus 30. Thereby, when the storage apparatus 30 is subject to vibration energy, the shock imposed on the storage apparatus 30 can be reduced by the first buffer members 40, and thus the lifetime of the storage apparatus can be increased. The first buffer members 40 and the frame 1 can be adapted by first forming the frame 1 via injection molding, then installing the first buffer members 40 in the first and the second penetrating troughs 11, 21, respectively, by, again, injection molding.

When the storage apparatus 30 is adapted in the frame 1 and experiences larger impact energy, the upper and the lower sides of the first penetrating trough 11 and the second penetrating trough 21 can probably break. The first buffer members 40 adapted in the first and the second penetrating troughs 11, 21 can reduce the breaking situations. However, because the first buffer members are compressible, when the frame 1 is subject to larger impact energy, the first buffer members 40 compress heavily, that is, the compression of the first and the second arms 10, 20 located in the first and the second penetrating troughs 11, 21 is huge, breaking still can possibly happen. Thereby, according to the present invention, a first reinforcement part 112 is adapted extending from the sidewall of the first penetrating trough 11, and a second reinforcement part 212 is adapted extending from the sidewall of the second penetrating trough 21. Hence, the compression of the first buffer members 40 is limited between the upper and lower sides of the first penetrating trough 11 and the first reinforcement part 112, or between the upper and lower sides of the second penetrating trough 21 and the second reinforcement part 212. Thus, the compression is much smaller than the original one. Accordingly, the reinforcement parts can prevent the vertical breaking situation of the first and the second arms 10, 20 when subject to external forces. In addition, by adapting the first reinforcement part 112 in the first penetrating trough 11 and the second reinforcement part 212 in the second penetrating trough 21, horizontal impact energy can be transmitted to the first buffer members 40 by the first and the second reinforcement parts 112, 212, and thereby be absorbed.

The first arm 10 and the second arm 20 have one or more pillars 50. By inserting said pillars 50 into a plurality of securing holes 35 on both sides of the storage apparatus 30, the storage apparatus 30 can be secured. The pillars 50 can be adapted on the first and the second arms 10, 20 by threads, respectively, and can be secured into the securing holes 35 of the storage apparatus 30 by threads as well. Alternatively, the pillars 50 can be adapted directly on the inner sides of the first and the second reinforcement parts 112, 212, which can be manufactured integrally with the pillars by injection molding. On the other hand, the pillars 50 can be adapted on the inner side of the first and the second arms 10, 20, and are formed integrally with the pillars 50. The end surfaces of the pillars 50 can be arbitrary geometric shapes. In the present preferred embodiment, the end surfaces of the pillars are cross-shaped. When installing the storage apparatus 30 to the present invention, it is only necessary to slightly move the first and the second arms 10, 20 to insert the pillars 50 to the securing holes 35 of the storage apparatus 30, without the need of using additional screws. Thereby, it is rapid and convenient to install or disassemble the storage apparatus 30 to or from the shack-absorbing structure.

Besides, because the first and the second reinforcement parts 112, 212 are like cantilevers, installing the pillars 50 thereon for securing the storage apparatus 30 makes the present invention function like a suspension system. That is, the storage apparatus 30 is suspended in the air. Thereby, the shock-absorbing structure can absorb horizontal and vertical impact energies. Hence, the storage apparatus 30 can be free from shakes and thereby damages while operating.

Furthermore, a second buffer member 45 is connected between the first and the second transition parts 12, 22 according to the present invention. The material of the second buffer member 45, which touches the storage apparatus 30, can be rubber as well. Thereby, the shock energy experienced by the storage apparatus 30 can be reduced. In addition, the installation of the storage apparatus 30 to the frame 1 is made easier. This is done owing to the elasticity of the second buffer member 45, which makes the first and the second transition parts 12, 22 move outwards when the first and the second arms 10, 20 are pulled, and hence the pillars 50 on the first and the second arms 10, 20 are easier to be inserted to the securing holes 35. Consequently, the assembly efficiency of the storage apparatus 30 is enhanced. Moreover, the frame 1 according to the present invention can further have a supporting part. Both sides of which supporting part can connect to the other sides of the first and the second arms 10, 20, respectively, and face the first and the second transition parts 12, 22. In addition to enhancing structural strength of the frame 1, the storage apparatus 30 can be supported by the supporting part as well.

Figure 3A:
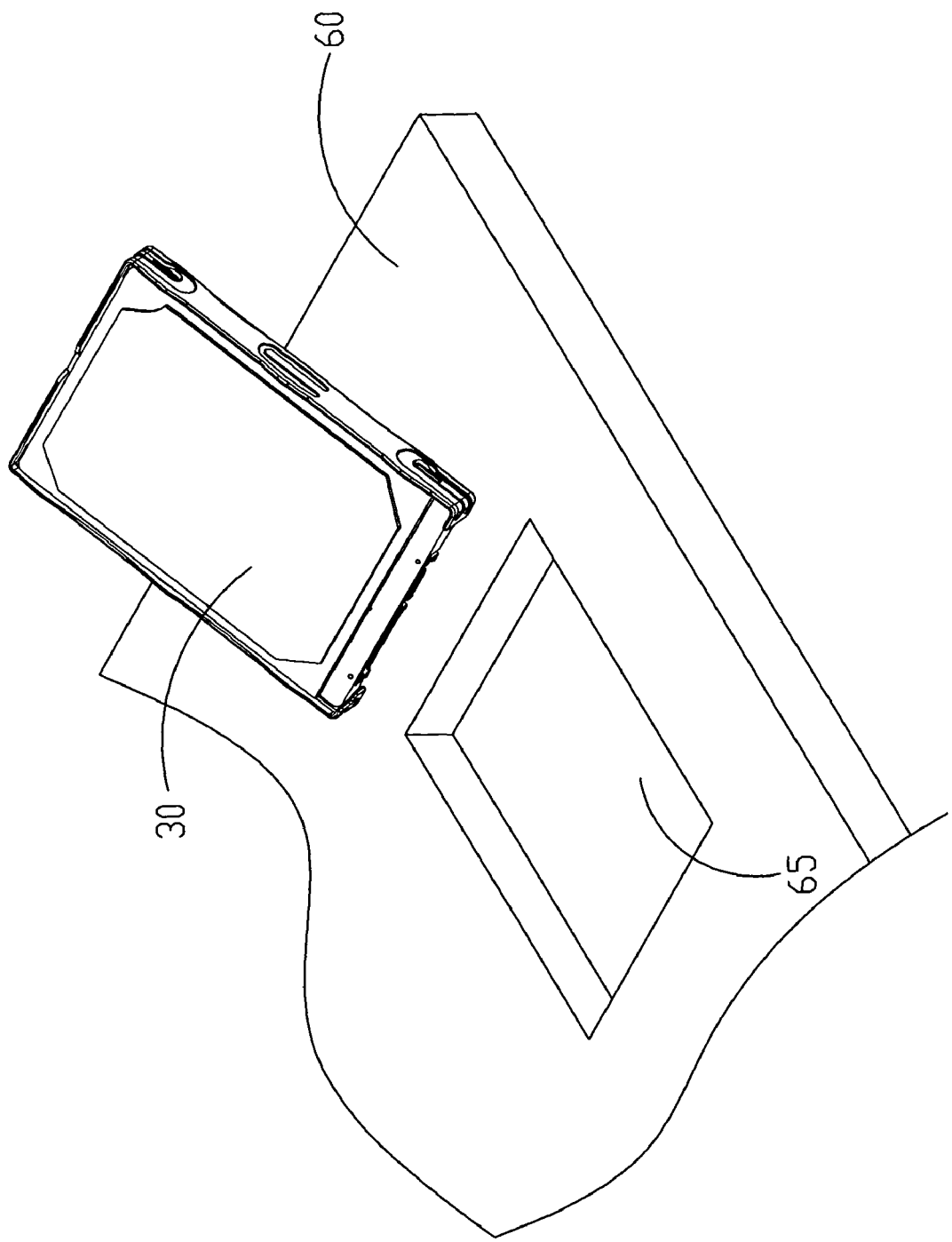
FIGS. 3A to 3C show assembly schematic diagrams according to a preferred embodiment of the present invention.
Figure 3B:
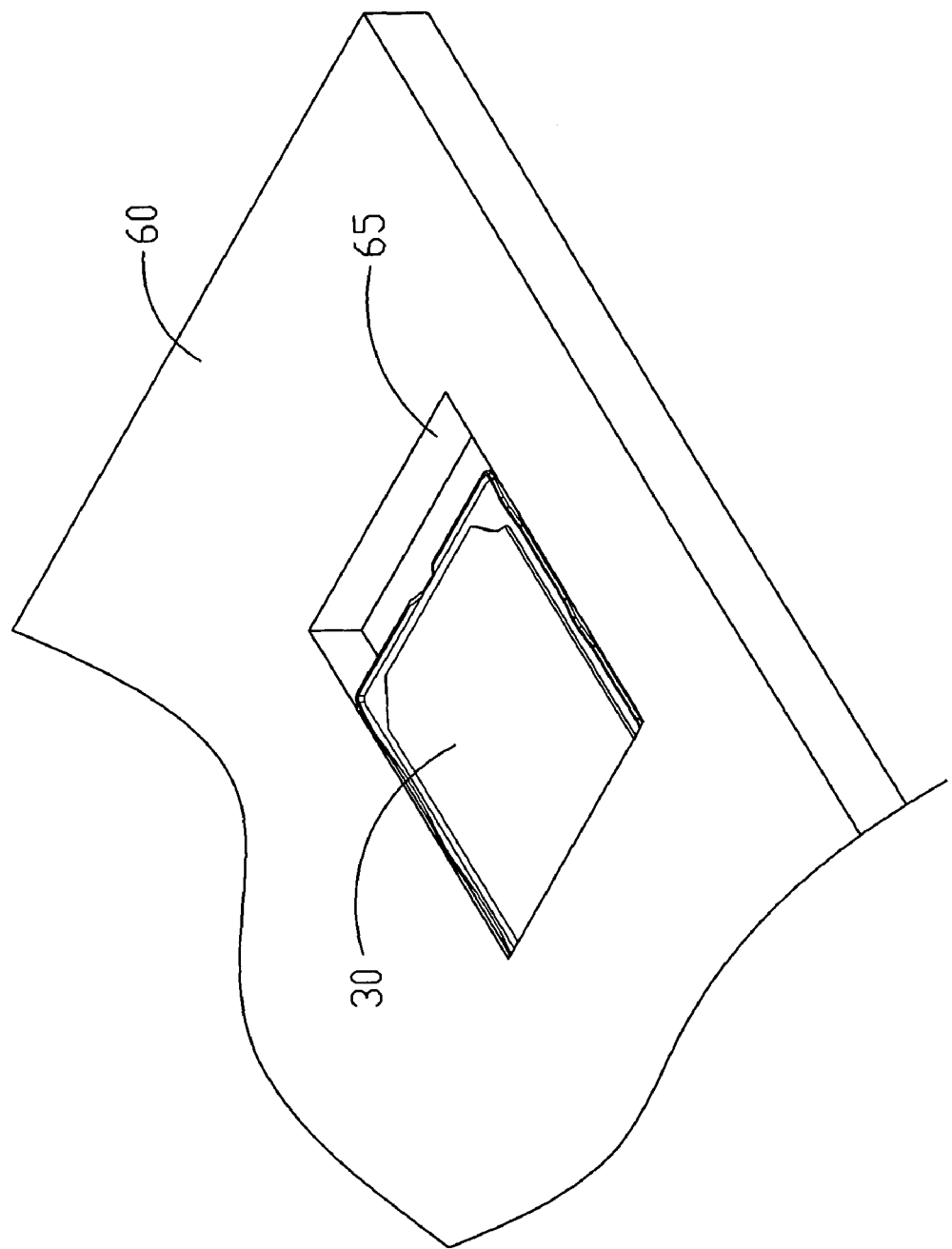
Figure 3C:
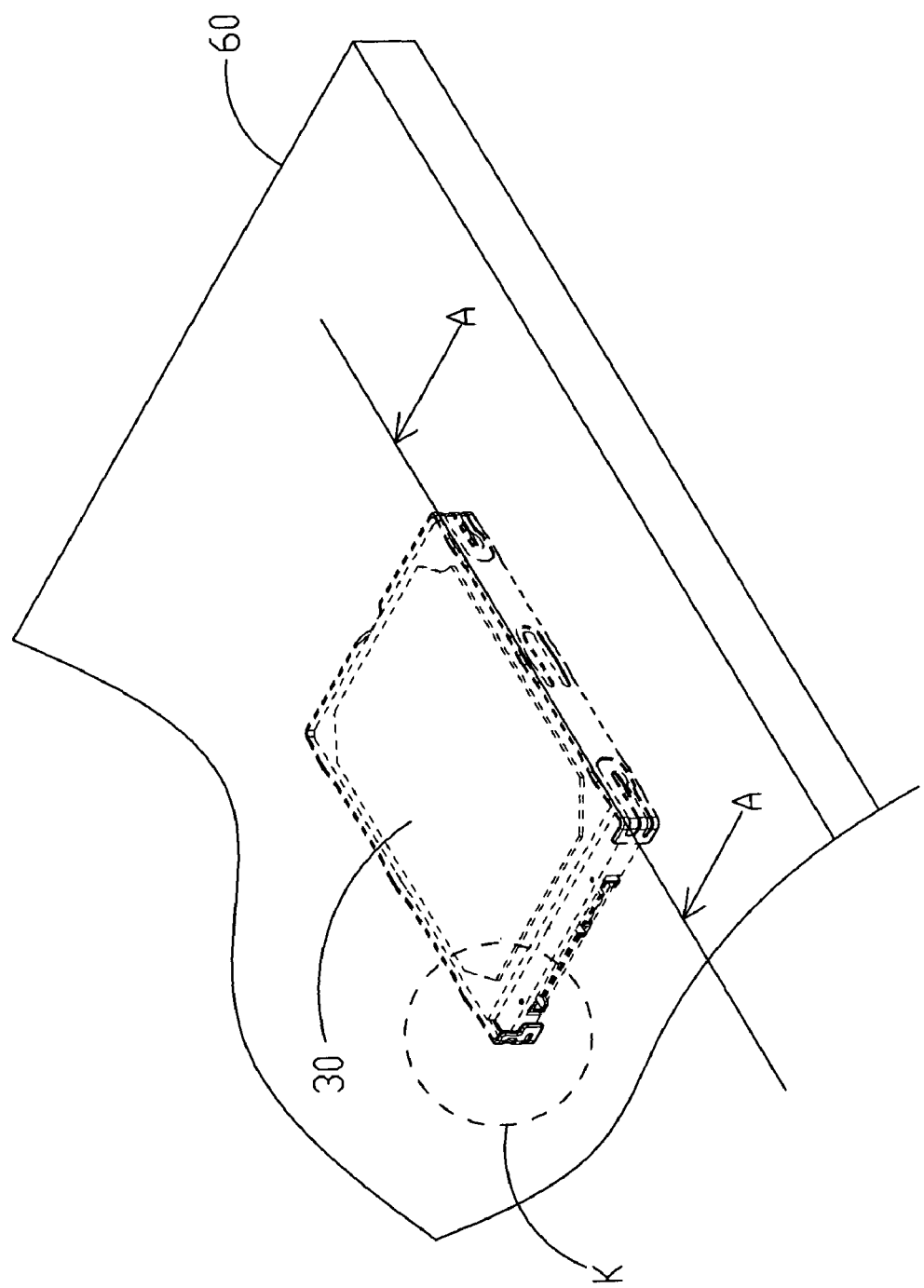
Figure 3D:
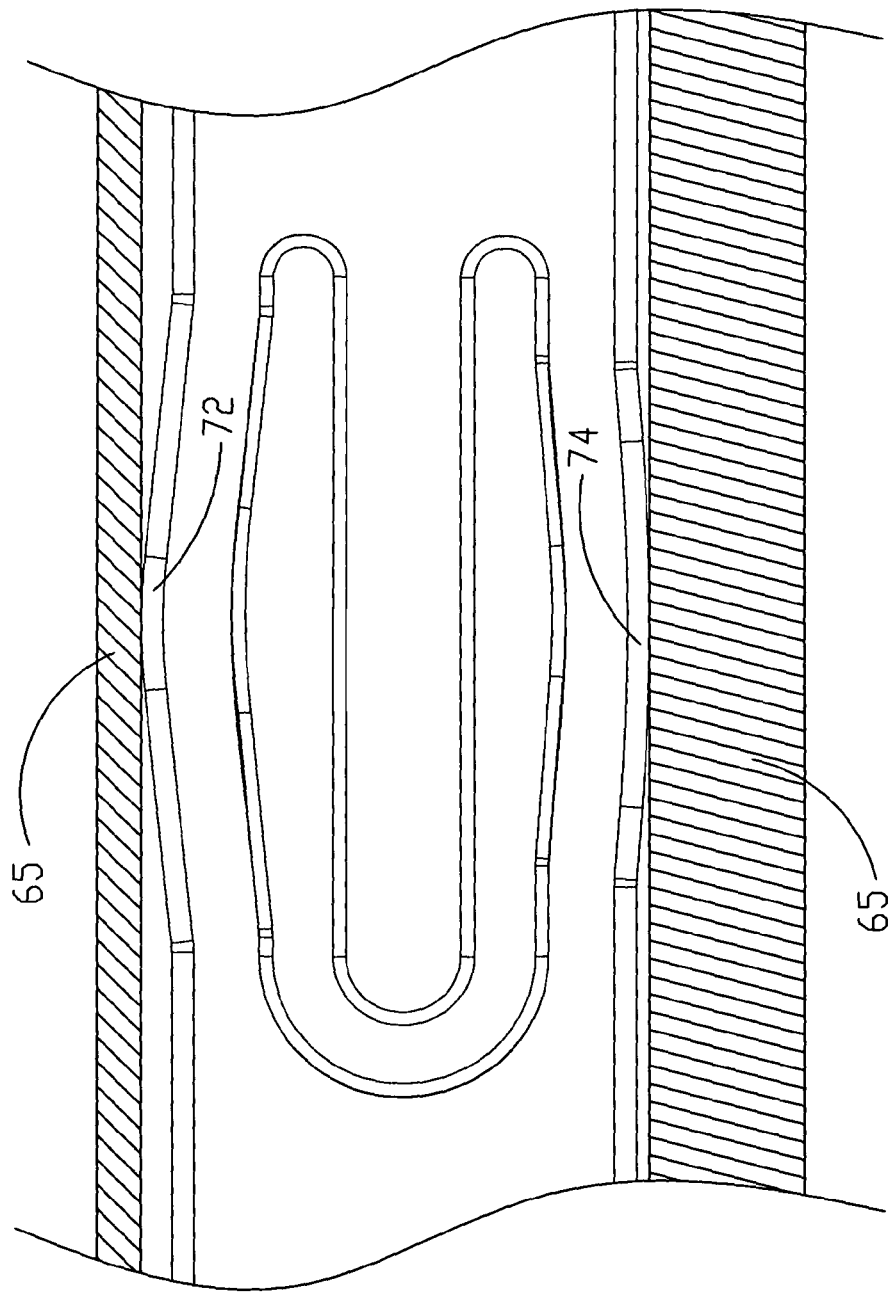
FIG. 3D shows a cross-sectional view along the A-A direction in FIG. 3C.
Figure 3E:
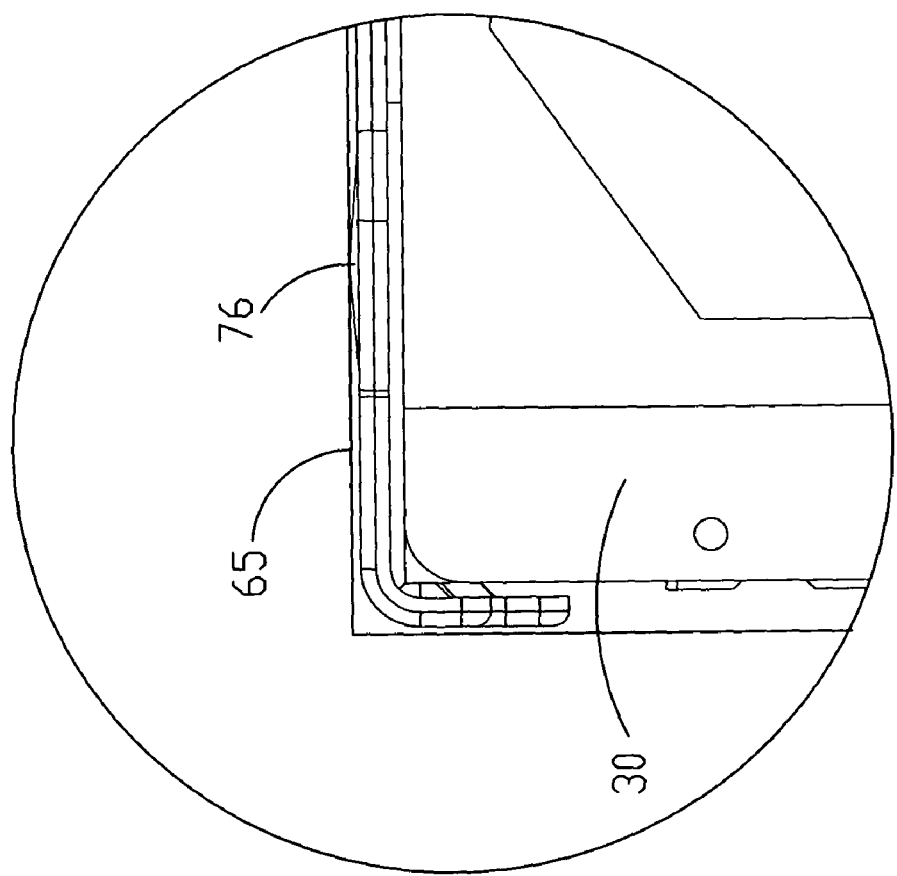
FIG. 3E shows a partial enlarged top view of FIG. 3C.

FIGS. 3A to 3C show assembly schematic diagrams according to a preferred embodiment of the present invention; FIG. 3D shows a cross-sectional view along the A-A direction in FIG. 3C; and FIG. 3E shows a partial enlarged top view of FIG. 3C. As shown in the figure, in order to make installation of the storage apparatus 30 with the shock-absorbing structure according to the present invention to a holding space 65 of a portable device 60 with smoothness, according to the present invention, a plurality of top salient parts 72 are adapted on the upper edges of the first and the second arms 10, 20, and a plurality of bottom salient parts 74 are adapted on the lower edges of the first and the second arms 10, 20. Thereby, when the present invention is to be installed to the holding space 65, the storage apparatus 30 is first placed into the holding space in an inclined angle. Then, the storage apparatus 30 is pushed into the holding space 65 to make the storage apparatus 30 and the portable device 60 connect electrically. Finally, the lid of the holding space 65 is covered. Accordingly, as shown in FIG. 3D, when the upper or the lower side of the first and the second arms 10, 20 contacts with the top wall or the bottom wall of the holding space 65, respectively, only the top salient parts 72 and the bottom salient parts 74 contact with the top wall or the bottom wall of the holding space 65, respectively. Therefore, the contact areas between the first and the second arms 10, 20 and the top wall and the bottom wall of the holding space 65 are reduced. Thus, the friction is reduced accordingly, and the storage apparatus 30 can be installed to the holding space 65 more smoothly. Besides, a gap is formed between the storage apparatus 30 and the top wall and the bottom wall of the holding space 65 to make air flow through the upper and the lower sides of the storage apparatus 30 with more ease. Hence, heat can be dissipated more easily. As a result, the heat efficiency of the storage apparatus 30 is enhanced, and the lifetime thereof is extended accordingly.

Likewise, as shown in FIG. 3E, a plurality of side salient parts 76 can be adapted on the outer sides of the first and the second reinforcement parts 112, 212, respectively. Thereby, when the frame 1 is installed to the holding space 65, the contact areas between the first and the second arms 10, 20 and the sidewalls of the holding space 65 are reduced. Consequently, the friction is reduced, which is convenient for installation.

In order to avoid shakes and secondary impacts after the storage apparatus 30 is installed in the holding space 65, according to the present invention, interference-fit method can be used to install the storage apparatus 30 in the holding space without additional gap. Because the frame 1 according to the present invention is elastic, assembly tolerance can be absorbed and reduced. The present invention can make use of interference-fit to install in to the holding space 65 and to secure the first and the second arms 10, 20 in the holding space 65. Thereby, the top, bottom, and side salient parts 72, 74, 76 according to the present invention will touch the surrounding sidewalls of the holding space 65 to ensure the frame 1 secured in the holding space 65. Besides, because the sidewalls of the holding space 65 will exert force on the side salient parts 76, the pillars 50 used for securing the storage apparatus 30 can be free of escaping from the securing holes 35. Hence, the storage apparatus 30 can be secured firmly.

In addition, when the present invention is subject to impacts, because the top, bottom, and side salient parts 72, 74, 76 according to the present invention touch the surrounding sidewalls of the holding space 65, the top salient parts 72 will pressed downwards to the first buffer members 40; the bottom salient parts 74 will pressed upwards to the first buffer members 40; the side salient parts 76, and thereby the first buffer members 40, will be pushed inwards. Therefore, surrounding impact energies will be absorbed, and the storage apparatus 30 can be free from said impacts. Besides, because the present invention uses interference-fit, secondary impacts can be avoided when the storage apparatus is subject to impacts. Thereby, the lifetime of the storage apparatus 30 can be increased effectively.

Furthermore, the sizes of the top, bottom, and side salient parts 72, 74, 76 can be determined according to the locations of heat sources. For example, if more heat is produced at bottom when the storage apparatus 30 operates, the size of the bottom salient parts 74 can be larger than the top salient parts 72 to make the gap between the bottom of the storage apparatus 30 and the holding space 65 larger. Hence, heat-dissipating efficiency can be enhanced.

Figure 4:
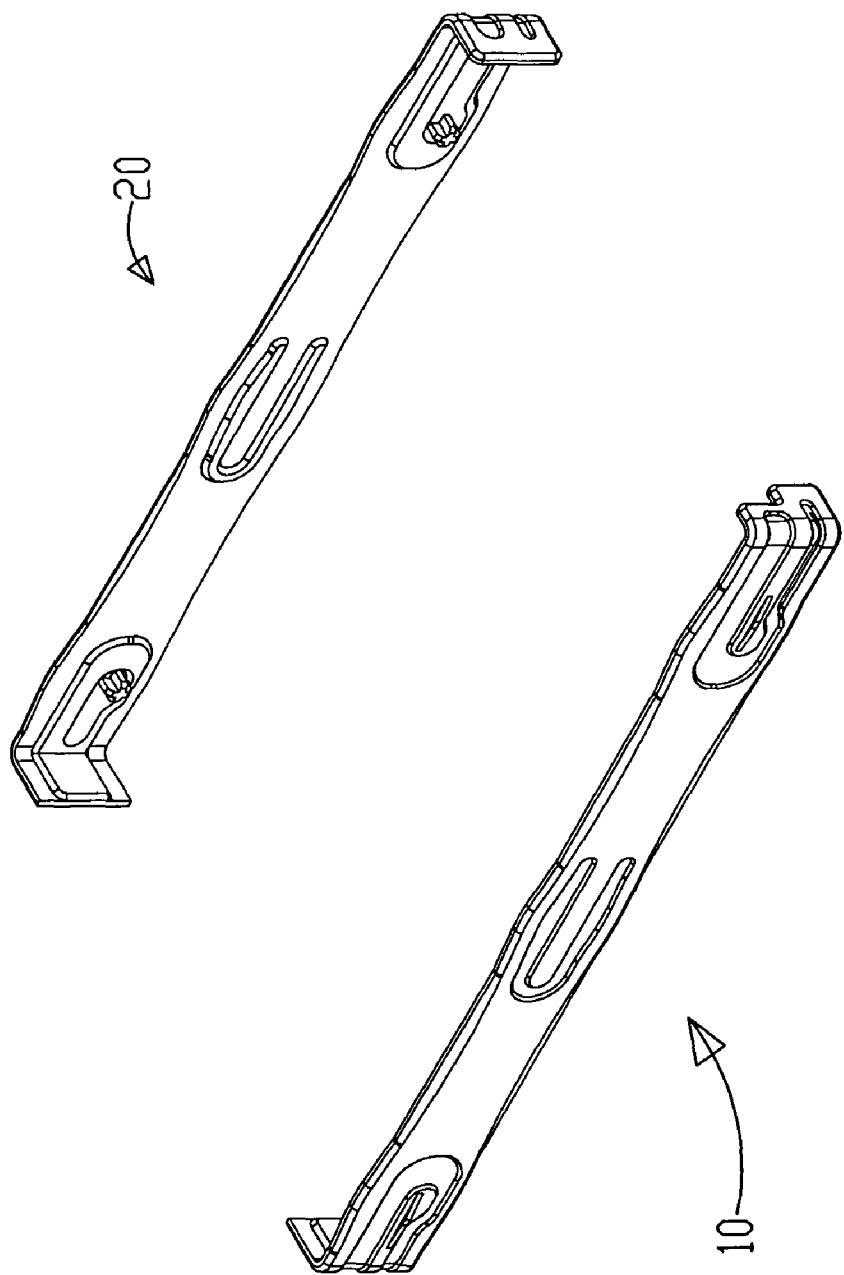
FIG. 4 shows another three-dimensional view of a shock-absorbing structure according to another preferred embodiment of the present invention.

FIG. 4 shows another three-dimensional view of a shock-absorbing structure according to another preferred embodiment of the present invention. The difference between the present preferred embodiment and the previous one is that in the previous preferred embodiment, the shock-absorbing structure is the frame 1. However, in the present preferred embodiment, only a first arm 10 and a second arm 20 are adapted on both sides of the storage apparatus 30, and the storage apparatus 30 with the first and the second arms 10, 20 is installed to the holding space 65. Hence, the vibration energy to the storage apparatus 30 can be reduced. The structure of the arms is the same as in the previous preferred embodiment.

To sum up, the shock-absorbing structure for a storage apparatus according to the present invention reduces impact energies experienced by the storage apparatus by a plurality of buffer members adapted in one or more first and second penetrating troughs, which are adapted on a first and a second arms secured on both sides of the storage apparatus.

Accordingly, the present invention conforms to the legal requirements owing to its novelty, non-obviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A shock-absorbing structure for a storage apparatus, comprising:
   a frame for securing the storage apparatus, the frame including:
   a first arm and a second arm, the first arm and the second arm securing both sides of the storage apparatus,
   at least one first penetrating trough and at least one second penetrating trough defined at a middle portion of the first arm and the second arm, respectively, and
   a first transition part and a second transition part extending from one end of the first arm and the second arm, respectively;
   a plurality of top salient parts and bottom salient parts disposed along the top and bottom edges, respectively, of the first arm and the second arm, wherein at least one top salient part and at least one bottom salient part are positioned substantially in alignment with said at least one first penetrating trough and said at least one second penetrating trough defined at said middle portion of said first and second arms, respectively; and
   a plurality of first buffer members disposed at the first and second penetrating troughs;
   wherein at least one pillar extends externally from the inner side of the first arm and the second arm, and the pillars of the first arm and the second arm extend for insert into a plurality of securing holes on both sides of the storage apparatus, respectively.

2. The shock-absorbing structure for a storage apparatus of claim 1, wherein the first arm and the second arm are formed integrally with the pillars, respectively.

3. The shock-absorbing structure for a storage apparatus of claim 1, wherein the pillars of the first arm are adapted on first reinforcement parts extending from the sidewalls of the first penetrating troughs, and the pillars of the second arm are adapted on second reinforcement parts extending from the sidewalls of the second penetrating troughs.

4. The shock-absorbing structure for a storage apparatus of claim 1, wherein a first reinforcement part and a second reinforcement part are adapted in the first penetrating trough and the second penetrating trough and extend from the sidewalls of the first penetrating troughs and the second penetrating trough, respectively, and side salient parts are adapted on outer sides of the first reinforcement part and the second reinforcement part, respectively.

5. The shock-absorbing structure for a storage apparatus of claim 1, wherein a second buffer member is adapted between the first transition part and the second transition part.

6. The shock-absorbing structure for a storage apparatus of claim 1, wherein a supporting part is adapted between the first arm and the second arm, and both sides of the supporting part are adapted on the other end of the first arm and the second arm.

7. A shock-absorbing structure for a storage apparatus, comprising:
- a first arm, securing one side of the storage apparatus, at least one first penetrating trough being defined at a middle portion of said first arm;
- a second arm, securing one side of the storage apparatus, at least one second penetrating trough being defined at a middle portion of said second arm; and
- a plurality of first buffer members disposed at the first and second penetrating troughs;
- wherein at least one pillar is disposed on the inner sides of the first arm and the second arm, the pillars of the first arm and the second arm extending for insert into a plurality of securing holes on both sides of the storage apparatus; the pillars of the first arm being disposed on first reinforcement parts extending from the sidewalls of the first penetrating troughs, and the pillars of the second arm being disposed on second reinforcement parts extending from the sidewalls of the second penetrating troughs; a plurality of top salient parts and bottom salient parts being disposed at a top and a bottom edges, respectively, of the first arm and the second arm, at least one of said top and bottom salient parts being located substantially in alignment with said at least first penetrating trough and said at least second penetrating trough defined of said middle portion of said first and second arms, respectively.

8. The shock-absorbing structure for a storage apparatus of claim 7, wherein first reinforcement parts extending from the sidewalls of the first penetrating troughs and second reinforcement parts extending from the sidewalls of the second penetrating troughs are adapted, respectively, and the first reinforcement parts and the second reinforcement parts are located in the first penetrating troughs and the second penetrating troughs, respectively.

\* \* \* \* \*